United States Patent
Yoshioka et al.

(10) Patent No.: US 8,081,212 B2
(45) Date of Patent: Dec. 20, 2011

(54) ABNORMALITY DETECTING APPARATUS

(75) Inventors: Kenji Yoshioka, Kanagawa (JP);
Masaki Sato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1065 days.

(21) Appl. No.: 11/914,817

(22) PCT Filed: May 19, 2006

(86) PCT No.: PCT/JP2006/310001
§ 371 (c)(1),
(2), (4) Date: Nov. 19, 2007

(87) PCT Pub. No.: WO2006/123769
PCT Pub. Date: Nov. 23, 2006

(65) Prior Publication Data
US 2009/0091622 A1   Apr. 9, 2009

(30) Foreign Application Priority Data

May 19, 2005  (JP) ................................. 2005-146867

(51) Int. Cl.
*H04N 7/18* (2006.01)
(52) U.S. Cl. ....................... 348/126; 348/133
(58) Field of Classification Search .................. 348/125, 348/133
See application file for complete search history.

(56) References Cited

U.S. PATENT DOCUMENTS

| | | | |
|---|---|---|---|
| 5,274,446 A * | 12/1993 | Ashida .......................... | 348/192 |
| 5,280,356 A * | 1/1994 | Hiramatsu et al. ............ | 348/691 |
| 5,953,057 A * | 9/1999 | Thompson et al. ........... | 348/192 |
| 6,411,330 B1 * | 6/2002 | Purcell et al. ................. | 348/180 |
| 6,972,681 B2 * | 12/2005 | Matsuoka et al. ............ | 340/541 |
| 7,334,054 B2 * | 2/2008 | Anderson ...................... | 710/15 |
| 7,633,560 B1 * | 12/2009 | Sivertsen ...................... | 348/705 |
| 2003/0090503 A1 * | 5/2003 | Leapman ...................... | 345/705 |
| 2009/0059085 A1 * | 3/2009 | Yoshioka ...................... | 348/725 |

* cited by examiner

*Primary Examiner* — Patrice Winder
(74) *Attorney, Agent, or Firm* — RatnerPrestia

(57) ABSTRACT

An abnormality detecting apparatus comprises a synchronous detecting circuit for detecting a synchronous signal from a video signal outputted from a camera unit, and an abnormality detecting circuit for judging whether or not a first direct current signal level obtained from an input path of said video signal is greater than a predetermined first threshold value, whether or not a second direct current signal level obtained from said input path of said video signal is smaller than a predetermined second threshold value, and whether or not said synchronous signal is detected by said synchronous detecting circuit, and determining that said input path of said video signal is in one of a normal state, an open state, a power connected state, and a ground connected state based on the result of the judgments.

8 Claims, 2 Drawing Sheets

ABNORMALITY DETECTING APPARATUS

THIS APPLICATION IS A U.S. NATIONAL PHASE APPLICATION OF PCT INTERNATIONAL APPLICATION PCT/2006/310001.

TECHNICAL FIELD OF THE INVENTION

The present invention relates to an abnormality detecting apparatus for detecting an abnormality in an input path of a video signal.

DESCRIPTION OF THE RELATED ART

Up until now, there has been proposed an abnormality detecting apparatus which is used for detecting an abnormality in an input path of a video signal, the abnormality detecting apparatus being adapted to judge as having an abnormality when a logical value indicated by parallel signals of a predetermined number of bits indicative of the video signal is smaller than a predetermined threshold value set at a value smaller than a dark output value for a predetermined time period, thereby enabling to diagnose a failure even if at least one of a plurality of input paths of the parallel signals may be disconnected or short-circuited, without increasing circuit construction (see, for example, Patent Document 1).

Patent Document 1: Japanese Laid-Open Patent Publication No. H08-19007.

SUMMARY OF THE INVENTION

Problems to be Solved by the Invention

The conventional abnormality detecting apparatus, however, encounters a drawback that a cause of an abnormality in the input path of the video signal cannot be located although the input path of the video signal can be diagnosed as being disconnected or short-circuited.

The present invention is made for the purpose of solving the conventional problems, and it is an object of the present invention to provide an abnormality detecting apparatus, which can locate the cause of abnormality in the input path of the video signal.

Means for Solving the Problems

In accordance with the present invention, there is provided an abnormality detecting apparatus, comprising: a synchronous detecting circuit for detecting a synchronous signal from a video signal outputted from a video outputting unit; and path state judging means for judging whether or not a first direct current signal level obtained from an input path of said video signal is greater than a predetermined first threshold value, whether or not a second direct current signal level obtained from said input path of said video signal is smaller than a predetermined second threshold value, and whether or not said synchronous signal is detected by said synchronous detecting circuit, and determining that said input path of said video signal is in one of a normal state, an open state, a power connected state, and a ground connected state based on the result of the judgments.

The abnormality detecting apparatus according to the present invention thus constructed as previously mentioned can locate the cause of abnormality in the input path of the video signal, resulting from the fact that the input path of the video signal is determined as being in one of the normal state, the open state, the power connected state, and the ground connected state based on the result of the judgment whether or not first direct current signal level is greater than the first threshold value, whether or not the second direct current signal level is lower than the second threshold value, and whether or not the synchronous signal is detected by the synchronous detecting circuit.

Further, said path state judging means may determine that said input path is in said normal state when said synchronous signal is detected by said synchronous detecting circuit.

Further, said path state judging means may determine that said input path is in said power connected state when said first direct current signal level is greater than said first threshold value.

Further, said path state judging means may determine that said input path is in said ground connected state when said second direct current signal level is smaller than said second threshold value.

Further, said path state judging means may determine that said input path is in said open state when said first direct current signal level is smaller than said first threshold value, said second direct current signal level is greater than said second threshold value, and said synchronous signal is not detected by said synchronous detecting circuit.

Further, said path state judging means may obtain said first direct current signal level and said second direct current signal level respectively by dividing voltage applied to said input path of said video signal.

Further, a state whether or not said first direct current signal level is greater than said first threshold value, a state whether or not said second direct current signal level is smaller than said second threshold value, and a state whether or not said synchronous signal is detected by said synchronous detecting circuit are respectively indicated by state signals, and said path state judging means may represent each of said states by two signals including a logical sum of one of said state signals and the other one of said state signal and a logical sum of said one of said state signals and the remaining one of said state signals.

Advantageous Effect of the Invention

The present invention can provide a abnormality detecting apparatus having advantageous effects of locating the cause of abnormality in the input path of the video signal.

Figure 1:
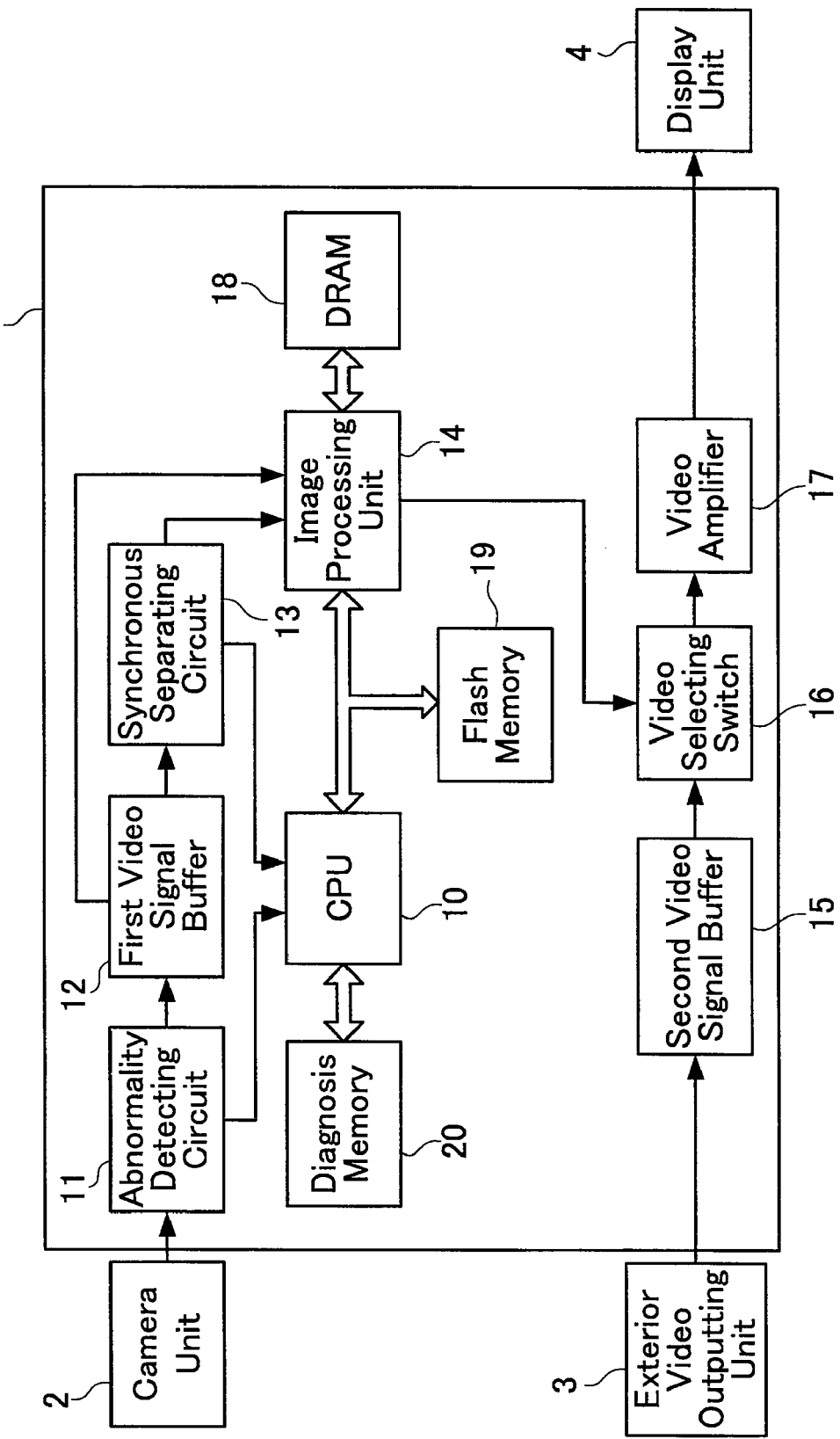
FIG. 1 is a block diagram showing a preferred embodiment of a video signal processing unit according to the present invention.

EXPLANATION OF THE REFERENCE NUMERALS 1 video signal processing unit
2 camera unit
3 exterior video outputting unit
4 display unit
10 CPU
11 abnormality detecting circuit
12 first video signal buffer
13 synchronous separating circuit
14 image processing unit
15 second video signal buffer

16 video selecting switch
17 video amplifier
18 DRAM
19 flash memory
20 diagnosis memory
30 comparator
31 synchronous detecting circuit
R1, R2, R3, R4, R5 resistor
C1 capacitor
D1, D2, D3, D4 diode
ZD zener diode

DESCRIPTION OF THE PREFERRED EMBODIMENTS

The embodiment of an abnormality detecting apparatus according to the present invention will be described hereinafter with reference to accompanying drawings. It is assumed in the present embodiment that an abnormality detecting apparatus according to the present invention is applied to a video signal processing unit, mounted on an automotive vehicle, for displaying a video signal outputted from a video outputting unit such as, for example, a camera unit, a video receiving unit, or the like.

FIG. 1 shows an abnormality detecting apparatus according to the present invention is applied to a video signal processing unit.

The video signal processing unit 1 is connected with a camera unit 2 for taking an image in the rear of an automotive vehicle, an exterior video outputting unit 3 such as, for example, a navigation unit, a television unit, and DVD (Digital Versatile Disc) player, or the like, and a display unit 4 for displaying the video signal processed by the video signal processing unit 1.

The camera unit 2 includes a lens and a CCD (Charged Coupled Device) sensor for taking images, and is adapted to generate a video signal based on detected signals outputted from the CCD sensor. Here, the video signal may include a composite signal, a RGB signal, a YUV signal, and/or the like.

The display unit 4 includes a display portion such as, for example, a cathode-ray tube, a liquid crystal display, and/or the like, adapted to display the video signal.

The video signal processing unit 1 includes a CPU (Central Processing Unit) 10, an abnormality detecting circuit 11 for detecting an abnormality in an input path of the video signal inputted from the camera unit 2, a first video signal buffer 12 for buffering the video signal inputted from the camera unit 2, a synchronous separating circuit 13 for separating a synchronous signal from the video signal inputted from the camera unit 2, an image processing unit 14 for carrying out an image processing, a second video signal buffer 15 for buffering a video signal outputted from the exterior video outputting unit 3, a video selecting switch 16 for selecting a video signal from among said video signal which has been image-processed and outputted from the image processing unit 14 and said video signal inputted from the exterior video outputting unit 3, a video amplifier 17 for amplifying said video signal selected by said video selecting switch 16, a DRAM (Dynamic Random Access Memory) 18, a flash memory 19, a diagnosis memory 20 for storing therein a result of a failure diagnosis, and a power supply unit, not shown, for supplying power to constituent components of the video signal processing unit 1 and the camera unit 2.

Here, "normal state" is intended to means a state that the input path of the video signal is normally connected with the camera unit 2, "open state" is intended to mean a state that the input path of the video signal is not connected with any components, "power connected state" is intended to mean a state that power voltage is applied to the input path of the video signal, and "ground connected state" is intended to mean a state that the input path of the video signal is short-circuited to ground.

The CPU 10 is adapted to read out programs stored in a storage medium such as, for example, a ROM (Read Only Memory), not shown, to be written into the DRAM 18, and execute the programs stored in the DRAM 18 to control the constituent components of, for example, the image processing unit 14, the video selecting switch 16, and the power supply unit.

The abnormality detecting circuit 11 constitutes path state judging means according to the present invention, and includes, for example, resistors R1 to R5, capacitor C1, a comparator 30, a synchronous detecting circuit 31, a zener diode ZD, and diodes D1 to D4.

The resistor R1, the zener diode ZD, the resistor R2, and the resistor R3 are sequentially connected with one another in series, the resistor R1 has one end, to which direct current (hereinlater referred to as "DC") voltage VCC is applied, and the resistor R3 has one end which is connected to ground.

The capacitor C1 has one end connected with a cathode of the zener diode ZD connected with the resistor R2, and the other end connected to ground, thereby making it possible for alternating current (hereinlater referred to as "AC") components to be connected to ground. This leads to the fact that input impedance of the video signal processing unit 1 is equal to a resistance value calculated when the resistor R2 and the resistor R3 are connected with each other in parallel. In the present embodiment, resistance values of the resistor R2 and resistor R3 are respectively set at values such that input impedance of the video signal processing unit 1 becomes 75 Ω so as to be consistent with impedance of the camera unit 2.

The comparator 30 is connected with an anode of the zener diode ZD, and adapted to compare the voltage value at the anode of the zener diode ZD with a reference voltage value. Here, the output voltage value of the comparator 30 is set at a high level (hereinlater simply referred to as "H"), for example, equal to or greater than 2.1 V when the voltage value at the anode of the zener diode ZD is smaller than the reference voltage value, and set at a low level (hereinlater simply referred to as "L"), for example, equal to or smaller than 0.7 V when the voltage value at the anode of the zener diode ZD is greater than the reference voltage value.

Further, the reference voltage value of the comparator 30 is set in such a manner that the output voltage value of the comparator 30 becomes H when the input path of the video signal is in the ground connected state, and the output voltage value of the comparator 30 becomes L when the input path of the video signal is in the other state.

The input voltage value of the comparator 30 constitutes a second direct current signal level according to the present invention, and the reference voltage value of the comparator 30 constitutes a second threshold value according to the present invention.

The zener diode ZD is adapted to protect the comparator 30 so that the input outage level of the comparator 30 will not exceed a predetermined value, in order to prevent latch-up from being occurred in the comparator 30 when the input path of the video signal falls in the power connected state.

The resistor R4 and the resistor R5 are connected with each other in series. The resistor R4 has one end connected with a position between the resistor R2 and the resistor R3, and the resistor R5 has one end connected to ground. Here, resistance values of the resistor R4 and the resistor R5 are respectively set in such a manner that voltage value between the resistor R4 and the resistor R5 becomes H when the input path of the video signal is in the power connected state, and the voltage value between the resistor R4 and the resistor R5 becomes L when the input path of the video signal is in the other state.

The voltage value between the resistor R4 and the resistor R5 constitutes a first direct current signal level according to the present invention, and an arbitrary voltage value between H and L constitutes a first threshold value according to the present invention.

The synchronous detecting circuit 31 has an input end connected between the resistor R2 and the resistor R3, and adapted to detect a synchronous signal from the video signal. For example, output voltage value of the synchronous detecting circuit 31 becomes H when the synchronous detecting circuit 31 can detect the synchronous signal by extracting synchronous signal components from the video signal and smoothing the synchronous signal components thus extracted, and the output voltage value of the synchronous detecting circuit 31, on the other hand, becomes L when the synchronous detecting circuit 31 cannot detect the synchronous signal from the video signal The diode D1 has an anode connected with an output end of the comparator 30, the diode D2 and the diode D4 respectively have anodes connected between the resistor R4 and the resistor R5, and the diode D3 has an anode connected with an output end of the synchronous detecting circuit 31. Cathodes of diode Dl and the diode D2 collectively form a logical OR circuit, and are adapted to output a first abnormality detecting signal (hereinlater referred to as "CAMIND1" ) to the CPU 10. Cathodes of diode D3 and the diode D4 collectively form a logical OR circuit, and are adapted to output a second abnormality detecting signal (hereinlater referred to as "CAMIND2" ) to the CPU 10.

In FIG. 1, the first video signal buffer 12 is adapted to buffer therein the video signal inputted from the camera unit 2, as well as fix a pedestal level (reference value of brightness).

The synchronous separating circuit 13 is adapted to separate a synchronous signal from the video signal buffered in the first video signal buffer 12. The CPU 10 is adapted to monitor a cycle of the synchronous signals separated by the synchronous separating circuit 13 and judge that the video signal is abnormal when the cycle of the synchronous signals is different from a predetermined cycle.

The image processing unit 14 is constituted by a digital signal processing device such as, for example, an image processing processor, and/or the like, and adapted to carry out, for example, a downward-view processing, a guideline drawing processing, and/or the like, on the video signal buffered in the first video signal buffer 12 under the control of the CPU 10.

Here, the downward-view processing is intended to mean a liner processing on a video image indicative of a curved portion of, for example, a bumper disposed in the vicinity of the vehicle body, so as to create a pseudo video image as if it is imaged from a position higher than the actual position of the camera unit 2. The guideline drawing processing is intended to mean a processing to draw information indicative of a driving direction, a distance from the other vehicles, and the like on the video image.

The second video signal buffer 15 is adapted to buffer therein the video signal inputted from the exterior video outputting unit 3, as well as fix a pedestal level (reference value of brightness).

The video selecting switch 16 is adapted to select one video signal from among video signals image-processed and outputted from the image processing unit 14, and inputted from the exterior video outputting unit 3 under the control of the CPU 10.

The video amplifier 17 is adapted to amplify the video signal selected by the video selecting switch 16 to have a signal level of the video signal adjusted to a signal level defined for the display unit 4.

The DRAM18 is adapted to temporarily store therein data to be used by the CPU 10 and the image processing unit 14 for computing operations, in addition to the programs to be executed by the CPU 10. The flash memory 19 is adapted to store therein parameters and the like, to be used by the image processing unit 14.

The diagnosis memory 20 is constituted by a nonvolatile storage medium such as, for example, an EEPROM (Electrically Erasable Programmable Read-only Memory). The diagnosis memory 20 is adapted to store therein a history of the abnormalities detected by the abnormality detecting circuit 11 such as, for example, a state of detected abnormality, a time at which the abnormality was detected, and the like, under the control of the CPU 10.

The CPU 10 is adapted to transfer information stored in the diagnosis memory 20 to a removable storage medium, not shown, and an interface circuit, not shown, for communicating with an external device.

The power supply unit is adapted to adjust, for example, step down, power supplied from a power source of the automotive vehicle to have the voltage-adjusted power supplied to the constituent components of the video signal processing unit 1 and the camera unit 2, under the control of the CPU 10. The power supply unit is adapted to cup off the power supply to the CPU 10 and the camera unit 2 in order to prevent latch-up from being occurred in the CPU 10 and the camera unit 2 when the CPU 10 is made inactive.

The operation of the video signal processing unit 1 thus constructed will be described hereinlater.

When an ignition power or an accessory power is turned on, the power supply unit is operated to supply power to the constituent components of the video signal processing unit 1, and then the constituent components of the video signal processing unit 1 is activated.

The video signal inputted from the exterior video outputting unit 3 is selected by the video selecting switch 16, in the case that a vehicle driver is not required to watch images in the rear of the automotive vehicle, for example, when a reverse gear is not engaged. The video signal outputted from the exterior video outputting unit 3 is inputted to the video amplifier 17 through the second video signal buffer 15 and the video selecting switch 16.

On the other hand, power is supplied from the power supply unit to the camera unit 2 to have the camera unit 2 activated, and the video signal image-processed by the image processing unit 14 is selected by the video selecting switch 16, in the case that the vehicle driver is required to watch images in the rear of the automotive vehicle, for example, when the reverse gear is engaged.

The video signal outputted from the camera unit 2 is inputted to the image processing unit 14 through the first video signal buffer 12, and image-processed by the image processing unit 14. The video signal image-processed by the image processing unit 14 is inputted to the video amplifier 17 through the video selecting switch 16.

The video signal thus inputted to the video amplifier 17 is amplified by the video amplifier 17 and then outputted to the display unit 4, to be displayed by the display unit 4.

The operation of the abnormality detecting circuit 11 will be described in detail with reference to FIG. 2. It is hereinlater assumed that the voltage value of the direct-current voltage VCC is, by way of example, 5V, the resistance value of the resistor R1 is, by way of example, 1.5 kΩ, the resistance value of the resistor R2 is, by way of example, 82 Ω, the resistance value of the resistor R3 is, by way of example, 1 kΩ, the resistance value of the resistor R4 is, by way of example, 4.7 kΩ, the resistance value of the resistor R5 is, by way of example, 10 kΩ, and the reference voltage value of the comparator 30 is, by way of example, 1.8V.

When the input path of the video signal is in the normal state, the video signal inputted to the comparator 30 is separated from DC components, and the voltage value of the video signal inputted to the comparator 30 thus becomes VCC×(R2+R3)÷(R1+R2+R3)≈2.1V. Since the output voltage value of the comparator 30 is higher than the reference voltage value, the output voltage value of the comparator 30 becomes H, and the voltage value of the diode D1 at the anode becomes L.

Further, since the voltage between the resistor R2 and the resistor R3 becomes VCC×R3÷(R1+R2+R3)≈1.9V, the voltage between the resistor R4 and the resistor R5 becomes 1.9V×R5÷(R4+R5)≈1.3V. Accordingly, the voltage values of the diode D2 and the diode D4 respectively at the anodes become L.

Further, since the synchronous detecting circuit 31 can detect the synchronous signal from the video signal, the output voltage value of the synchronous detecting circuit 31 becomes H, and the voltage value of the diode D3 at the anode becomes H.

Accordingly, CAMIND1 becomes L, and CAMIND2 becomes H, when the input path of the video signal is in the normal state.

When, on the other hand, the input path of the video signal in the open state, the voltage value of the diode D1 at the anode becomes L, in the same manner as in the normal state. Further the voltage values of the diode D2 and the diode D4 respectively at the anodes become L, in the same manner as in the normal state. Since the synchronous detecting circuit 31 cannot detect the synchronous signal from the video signal, the output voltage value of the synchronous detecting unit 31 becomes L, and the voltage value of the diode D3 becomes L.

Accordingly, CAMIND1 becomes L, and CAMIND2 becomes L, when the input path of the video signal is in the open state.

When the input path of the video signal is in the power connected state, the voltage value of the diode D1 at the anode becomes L, in the same manner as in the normal state. Assuming that voltage applied to the input path of the video signal in the power connected state is 9V, since 9V×R5÷(R4+R5)≈6.1V, the voltage values of the diode D2 and the diode D4 respectively at the anodes become H. Further, since the synchronous detecting circuit 31 cannot detect the synchronous signal from the video signal, the output voltage value of the synchronous detecting circuit 31 becomes L, and the voltage value of the diode D3 at the anode becomes L.

Accordingly, CAMIND1 becomes H, and CAMIND2 becomes H, when the input path of the video signal is in the power connected state.

When, on the other hand, the input path of the video signal is in the ground connected state, the voltage value of a signal inputted to the comparator 30 becomes VCC×R2÷(R1+R2)≈0.5V. Since the voltage value of the input signal is lower than the reference voltage value, the output voltage value of the comparator 30 becomes H, and the voltage value of the diode D1 at the anode becomes H.

Further, since the voltage value between the resistor R2 and the resistor R3 becomes 0V, the voltage value between the resistor R4 and the resistor R5 becomes 0V, and the voltage values of the diode D2 and the diode D4 respectively at anodes become L.

Accordingly, CAMIND1 becomes H, and CAMIND2 becomes L, when the input path of the video signal is in the ground connected state.

As will be appreciated from the foregoing description, the present embodiment of the video signal processing unit 1 can locate the cause of abnormality in the input path of the video signal, resulting from the fact that the combination of (CAMIND1 and CAMIND2) becomes (L, H)(L, L)(H, H) and (H, L), when the input path of the video signal is in the normal state, normal state, the open state, the power connected state, and the ground connected state, respectively.

Further, it has been described in thee present embodiment that the video signal inputted to the abnormality detecting circuit 11 is inputted from the camera unit 2, the video signal may be inputted from any other video outputting means such as, for example, the navigation unit, the television unit, the DVD player, and/or the like, in place of the camera unit 2.

Figure 2:
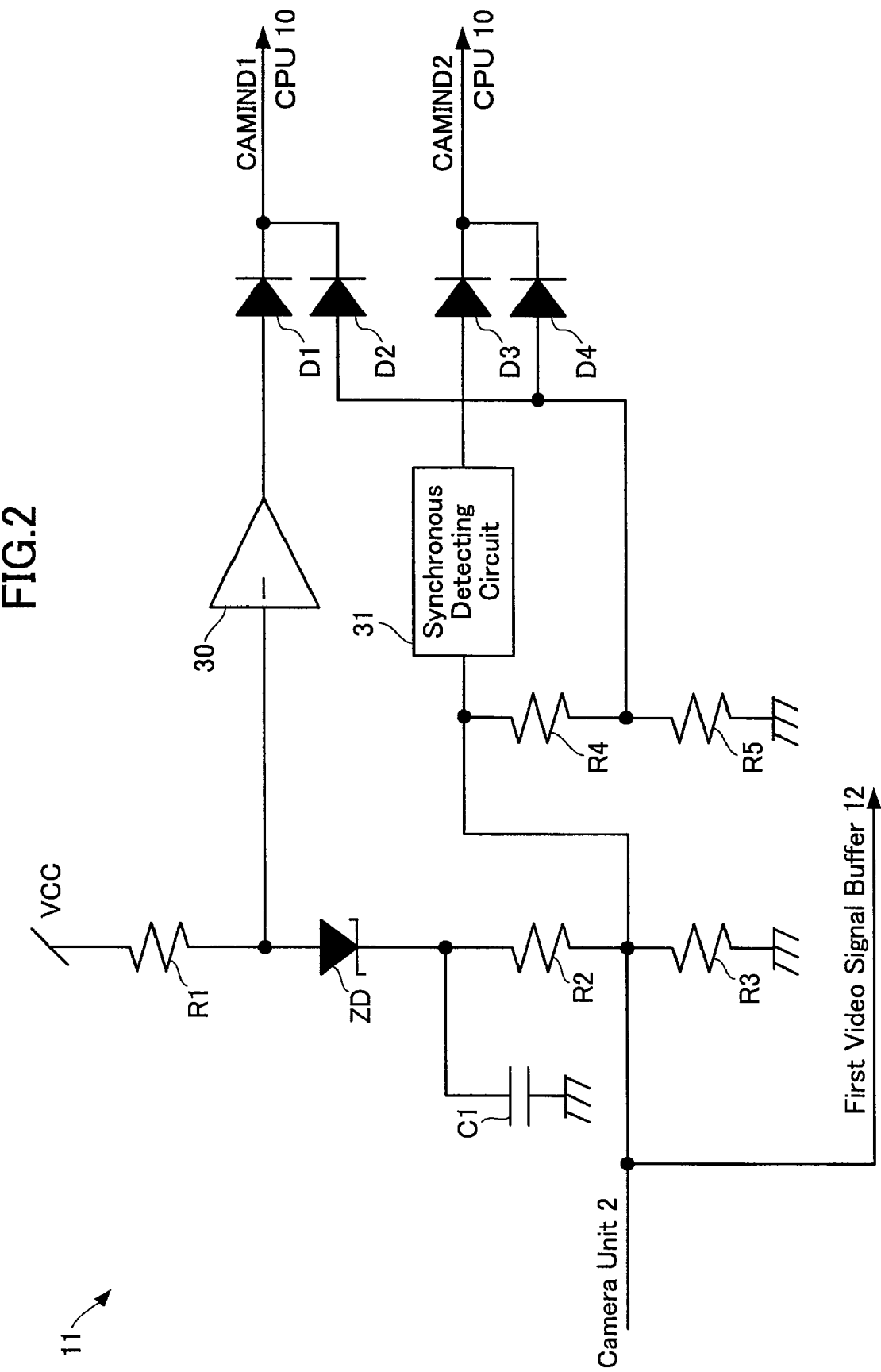
FIG. 2 is a block diagram showing a preferred embodiment of an abnormality detecting circuit forming part of a video signal processing unit according to the present invention.

While it has been described in the abnormality detecting circuit 11 shown in FIG. 2, the anode of diodeD2 is connected between the resistor R4 and the resistor R5, the anode of diodeD2 may be connected with an output end of the comparator 30, in place of a position between the resistor R4 and the resistor R5.

Further, in the abnormality detecting circuit 11, the anode of the diode 4 may be connected with an output end of the synchronous detecting circuit 31, in place of a position between the resistor R4 and the resistor R5.

INDUSTRIAL APPLICABILITY

As will be appreciated from the foregoing description, the abnormality detecting apparatus according to the present invention has advantageous effects of locating the cause of abnormality in the input path of the video signal, and is available as, for example, an abnormality detecting apparatus for detecting abnormality in the input path of the video signal.

What is claimed is:
1. An abnormality detecting apparatus, comprising:
a synchronous detecting circuit for detecting a synchronous signal from a video signal outputted from a video outputting unit; and
path state judging means for judging whether or not a first direct current signal level obtained from an input path of said video signal is greater than a predetermined first threshold value, whether or not a second direct current signal level obtained from said input path of said video signal is smaller than a predetermined second threshold value, and whether or not said synchronous signal is detected by said synchronous detecting circuit, and determining that said input path of said video signal is in one of a normal state, an open state, a power connected state, and a ground connected state based on the result of the judgments, in which
said path state judging means is operative to determine that said input path is in said open state when said first direct current signal level is smaller than said first threshold value, said second direct current signal level is greater than said second threshold value, and said synchronous signal is not detected by said synchronous detecting circuit.
2. An abnormality detecting apparatus as set forth in claim 1, in which said path state judging means is operative to determine that said input path is in said normal state when said synchronous signal is detected by said synchronous detecting circuit.

3. An abnormality detecting apparatus as set forth in claim 1, in which said path state judging means is operative to determine that said input path is in said power connected state when said first direct current signal level is greater than said first threshold value.

4. An abnormality detecting apparatus as set forth in claim 1, in which said path state judging means is operative to determine that said input path is in said ground connected state when said second direct current signal level is smaller than said second threshold value.

5. An abnormality detecting apparatus as set forth in claim 1, in which said path state judging means is operative to obtain said first direct current signal level and said second direct current signal level respectively by dividing voltage applied to said input path of said video signal.

6. An abnormality detecting apparatus, comprising:
a synchronous detecting circuit for detecting a synchronous signal from a video signal outputted from a video outputting unit; and
path state judging means for judging whether or not a first direct current signal level obtained from an input path of said video signal is greater than a predetermined first threshold value, whether or not a second direct current signal level obtained from said input path of said video signal is smaller than a predetermined second threshold value, and whether or not said synchronous signal is detected by said synchronous detecting circuit, and determining that said input path of said video signal is in one of a normal state, an open state, a power connected state, and a ground connected state based on the result of the judgments, in which
a state whether or not said first direct current signal level is greater than said first threshold value, a state whether or not said second direct current signal level is smaller than said second threshold value, and a state whether or not said synchronous signal is detected by said synchronous detecting circuit are respectively indicated by state signals, and
said path state judging means is operative to represent each of said states by two signals including a logical sum of one of said state signals and the other one of said state signal and a logical sum of said one of said state signals and the remaining one of said state signals.

7. A video system, comprising:
a video outputting unit for outputting a video signal;
a display unit for displaying said video signal; and
a video signal processing unit for having said display unit display said video signal outputted from said video outputting unit, and in which
said video signal processing unit includes a synchronous detecting circuit for detecting a synchronous signal from said video signal outputted from said video outputting unit, and path state judging means for judging whether or not a first direct current signal level obtained from an input path of said video signal is greater than a predetermined first threshold value, whether or not a second direct current signal level obtained from said input path of said video signal is smaller than a predetermined second threshold value, and whether or not said synchronous signal is detected by said synchronous detecting circuit, and determining that said input path of said video signal is in one of a normal state, an open state, a power connected state, and a ground connected state based on the result of the judgments, and in which
said path state judging means is operative to determine that said input path is in said open state when said first direct current signal level is smaller than said first threshold value, said second direct current signal level is greater than said second threshold value, and said synchronous signal is not detected by said synchronous detecting circuit.

8. A video system, comprising:
a video outputting unit for outputting a video signal;
a display unit for displaying said video signal; and
a video signal processing unit for having said display unit display said video signal outputted from said video outputting unit, and in which
said video signal processing unit includes a synchronous detecting circuit for detecting a synchronous signal from said video signal outputted from said video outputting unit, and path state judging means for judging whether or not a first direct current signal level obtained from an input path of said video signal is greater than a predetermined first threshold value, whether or not a second direct current signal level obtained from said input path of said video signal is smaller than a predetermined second threshold value, and whether or not said synchronous signal is detected by said synchronous detecting circuit, and determining that said input path of said video signal is in one of a normal state, an open state, a power connected state, and a ground connected state based on the result of the judgments, and in which
a state whether or not said first direct current signal level is greater than said first threshold value, a state whether or not said second direct current signal level is smaller than said second threshold value, and a state whether or not said synchronous signal is detected by said synchronous detecting circuit are respectively indicated by state signals, and
said path state judging means is operative to represent each of said states by two signals including a logical sum of one of said state signals and the other one of said state signal and a logical sum of said one of said state signals and the remaining one of said state signals.

* * * * *